(12) United States Patent
Nishiwaki et al.

(10) Patent No.: US 6,185,056 B1
(45) Date of Patent: Feb. 6, 2001

(54) PRISM AND MANUFACTURING METHOD THEREOF, OPTICAL BEAM SHAPING APPARATUS AND OPTICAL HEAD DEVICE UTILIZING SUCH PRISM, AND OPTICAL BEAM SHAPING METHOD

(75) Inventors: Seiji Nishiwaki, Osaka; Tetsuo Saimi, Hirakata, both of (JP)

(73) Assignee: Matsushita Electric Industrial Co. Ltd., Osaka (JP)

( * ) Notice: Under 35 U.S.C. 154(b), the term of this patent shall be extended for 0 days.

(21) Appl. No.: 09/010,724

(22) Filed: Jan. 22, 1998

(30) Foreign Application Priority Data

Jan. 22, 1997 (JP) .................................................. 9-009348

(51) Int. Cl.$^7$ ...................................................... G02B 5/04
(52) U.S. Cl. ........................... 359/837; 359/831; 359/833
(58) Field of Search ................................. 359/831, 833, 359/834, 837

(56) References Cited

U.S. PATENT DOCUMENTS

| 2,305,777 | * | 12/1942 | Hansen et al. ........................ 359/837 |
| 4,411,492 | * | 10/1983 | Bluege ................................. 359/833 |
| 4,750,819 | * | 6/1988 | Sugiki ................................. 359/833 |
| 5,013,136 | * | 5/1991 | Whitehead et al. ................... 359/834 |
| 5,596,456 | * | 1/1997 | Luecke ................................ 359/831 |

FOREIGN PATENT DOCUMENTS 62-187321   8/1987  (JP) .

* cited by examiner

*Primary Examiner*—Audrey Chang
*Assistant Examiner*—Jennifer Winstedt
(74) *Attorney, Agent, or Firm*—Renner, Otto, Boisselle & Sklar

(57) ABSTRACT

A prism includes: a first portion made of a first material having a wavelength dependency in a refractive index; and a second portion adhered to the first portion, the second portion being made of a second material having a wavelength dependency in a refractive index which is different from the wavelength dependency in the refractive index of the first material. The first portion and the second portion have shapes such that the wavelength dependency in the refractive index of the first portion and the wavelength dependency in the refractive index of the second portion are substantially cancelled by each other.

14 Claims, 5 Drawing Sheets

PRIOR ART $\alpha_1 = 18.0°$   $\alpha_2 = 25.0°$   $\alpha_3 = 33.0°$ $\alpha_1 = 18.0°$   $\alpha_2 = 39.0°$   $\alpha_3 = 33.0°$

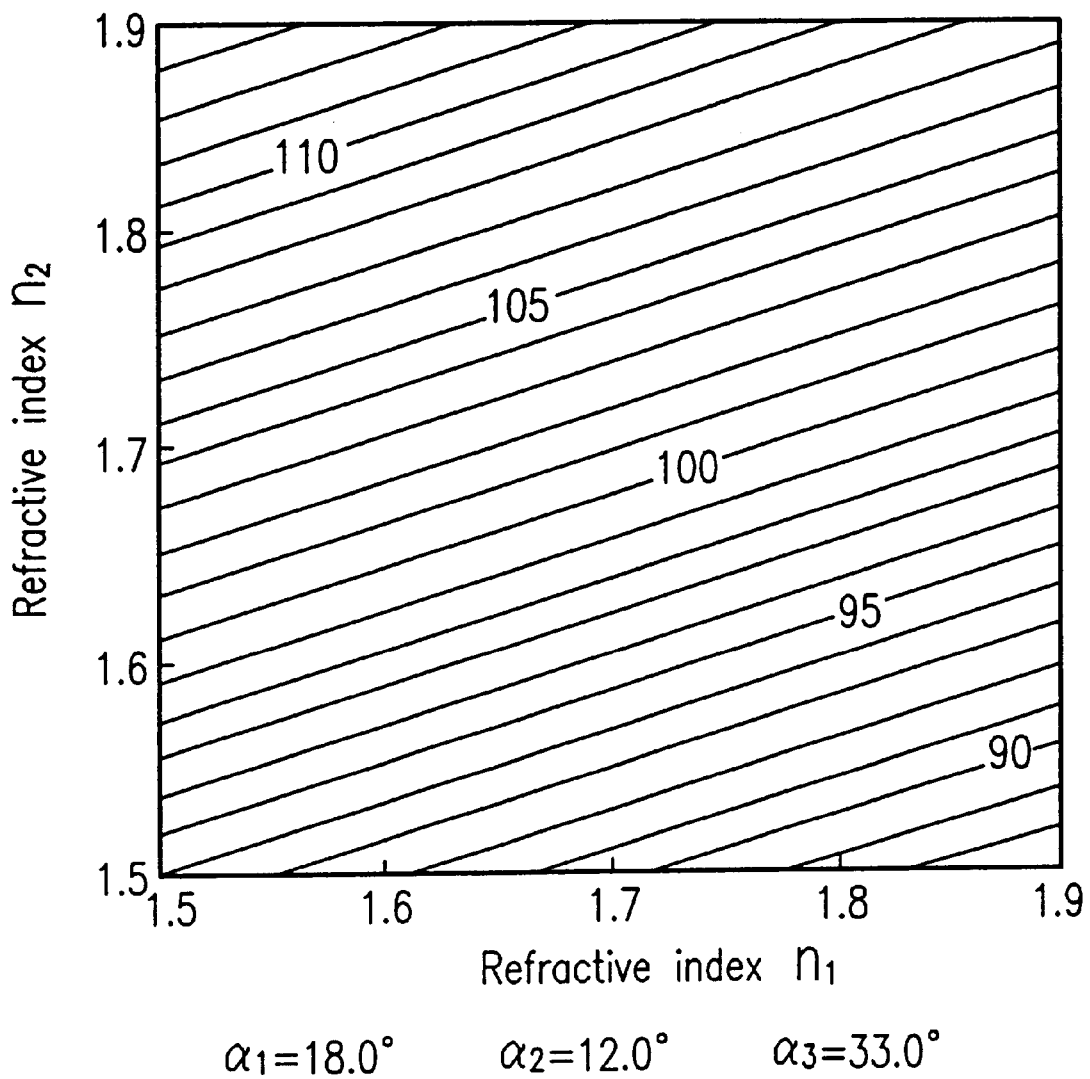

PRISM AND MANUFACTURING METHOD THEREOF, OPTICAL BEAM SHAPING APPARATUS AND OPTICAL HEAD DEVICE UTILIZING SUCH PRISM, AND OPTICAL BEAM SHAPING METHOD

BACKGROUND OF THE INVENTION

1. Field of the Invention

The present invention relates to a prism which may be incorporated, for example, in an optical head used for recording/reproducing signals on an optical disk, and a method for producing the prism. The present invention further relates to an optical beam shaping apparatus using the above-mentioned prism for shaping a spatial light intensity distribution (for example, for shaping from an oval distribution to a circular distribution) of a light beam such as laser light, and an optical head device employing such an optical beam shaping apparatus. The present invention further relates to a method for shaping a light beam.

2. Description of the Related Art

FIG. 1 is a schematic cross-sectional view showing an optical beam shaping apparatus disclosed in Japanese Laid-Open Publication No. 62-187321 as an example of a conventional optical beam shaping apparatus. Herein, a refractive index of air is referred to as $n_0=1$.

In the optical beam shaping apparatus shown in FIG. 1, a laser light 2 is emitted from a semiconductor laser 1, transmitted through a collimating lens 3, and is thereby converted into a parallel light 4. The parallel light 4, in turn, is incident on a surface 5A of a prism 5 made of a glass material (with a refractive index of $n_1$) at an incident angle $\psi_1$, (wherein $\psi_1$ is an angle defined by the incident light 4 and a normal 5A' to the surface 5A of the prism 5). The incident light 4 is refracted at the surface 5A of the prism 5, and becomes a refracted light 4a having a refractive angle $\psi_1'$ with respect to the normal 5A' and an angle $\theta_2$ (not shown) with respect to the incident light 4.

The refracted light 4a is then incident on a surface 5B (or "a bottom surface 5B" which opposes the surface 5A of the prism 5) at an incident angle $\psi_2$ (wherein $\psi_2$ is an angle defined by the light 4a and a normal 5B' to the surface 5B). The refracted light 4a reflects off the surface 5B and becomes a reflected light 4a'. An angle between the reflected light 4a' and the incident light 4 is referred to as an angle $\theta_2'$ (not shown).

The reflected light 4a' is incident on the surface 5A at an incident angle $\psi_{21}$ (wherein $\psi_{21}$ is an angle defined by the light 4a' and the normal 5A'), thereby being refracted by a refractive angle $\psi_{21}'$ to the normal 5A' and becomes emitting light 6. An angle between the refracted light 6 (i.e., the emitting light 6) and the original incident light 4 is referred to as an azimuth angle $\theta_{21}'$ (not shown).

When the surface 5A of the prism 5 is inclined by $\alpha_1$ to the incident light 4, the incident angle $\psi_1$ is characterized as follows:

$$\psi_1=\pi/2-\alpha_1 \qquad \text{Formula (1)}$$

Further, the following Formula (2) is derived from Snell's Law at the surface 5A:

$$\sin \psi_1 = n_1 \sin \psi_1' \qquad \text{Formula (2)}$$

Due to this refraction, the incident light 4 is either magnified or reduced by a factor of $(\cos\psi_1'/\cos\psi_1)$ within the refracting plane (i.e., within the plane of the drawing).

The azimuth angle $\theta_2$ of the refracted light 4a is given by the following Formula (3):

$$\theta_2 = -\pi/2+\alpha_1+\psi_1' \qquad \text{Formula (3)}$$

When the bottom surface 5B is inclined by $\alpha_2$ to the incident light 4, the incident angle $\psi_2$ is characterized as follows:

$$\psi_2=\pi/2-\alpha_2+\theta_2 \qquad \text{Formula (4)}$$

Further, the following Formula (5) is derived from the Law of Reflection at the bottom surface 5B:

$$\theta_2'=\pi/2+\alpha_2-\psi_2 \qquad \text{Formula (5)}$$

The incident angle $\psi_{21}$ of the light 4a' to the surface 5A is given by the following Formula (6):

$$\psi_{21}=\pi/2+\alpha_1-\theta_2' \qquad \text{Formula (6)}$$

Further, the following Formula (7) is derived from Snell's Law at the surface 5A:

$$n_1 \sin \psi_{21} = \sin \psi_{21}' \qquad \text{Formula (7)}$$

Due to this refraction, the light is further magnified or reduced by a factor of $(\cos \psi_{21}'/\cos \psi_{21})$ within the refracting plane.

The azimuth angle $\theta_{21}'$ of the emitting light 6 is given by the following Formula (8):

$$\theta_{21}'=\pi/2+\alpha_1-\psi_{21}' \qquad \text{Formula (8)}$$

Due to the two refractions at the surface 5A, the emitting light 6 is either magnified or reduced by a factor of m within the refracting plane, where m is given by the following Formula (9):

$$m=(\cos \psi_1'/\cos \psi_1)\cdot(\cos \psi_{21}'/\cos \psi_{21}) \qquad \text{Formula (9)}$$

By sequentially applying the above-mentioned Formulae (1) through (9), for example, when BK7 is selected as a glass material for forming the prism 5 under the following conditions: an oscillation wavelength of the semiconductor laser $1=0.64385$ μm (where $n_1=1.51425$); $\alpha_1=17.59°$; and $\alpha_2=31.340$, an azimuth angle $\theta_{21}'$ of the emitting light 6 of 89.9963° and a magnification ratio m of 2.501 are obtained. The traveling direction of the emitting light 6 is bent by an angle of about 90° with respect to that of the incident light 4 and the beam is magnified about 2.5 times within the refracting plane.

In general, the parallel light 4 derived from the light 2 emitted from the semiconductor laser 1 has an oval spatial light intensity distribution (an oval cross-sectional intensity with an ellipticity of about 2.5). The above-described prism 5 magnifies the spatial light intensity distribution in a direction along a minor axis of the oval distribution, thereby obtaining the parallel light having a circular spatial light intensity distribution (a circular cross-sectional intensity).

However, such a conventional light beam shaping apparatus has the following problems.

A glass material forming the prism 5 always has a wavelength dependency of the refractive index (i.e., "dispersion"). Specifically, the refractive index of the light becomes smaller as the wavelength of the light becomes longer. For example, in the case where the prism 5 is made of BK7 under the conditions where an oscillation wavelength of the semiconductor laser 1 is 0.70652 μm, the refractive index $n_1$ of the prism 5 is 1.51243. Under this circumstance, the azimuth angle (emitting angle) $\theta_{21}'$ of the emitting light 6 is 89.9313° which is smaller by 0.065° than that in the above-described case where the oscillation wavelength of the semiconductor laser 1 is 0.64385 µm.

Generally, due to variation in the output of the semiconductor laser 1, the oscillation wavelength is momentarily fluctuated several nanometers. When the oscillation wavelength is fluctuated, for example, by 10 nm in the above-described conventional optical beam shaping apparatus which employs the prism 5 made of BK7, the azimuth angle $\theta_{21}'$ of the emitting light 6 changes by 0.0104°.

In the case where the emitting light 6 is focused by an objective lens (e.g., with a focal length of 3 mm) so as to be used in an optical head for recording/reproducing signals in an optical disk, the above-mentioned change in the angle of 0.0104° will result in a spot displacement of 0.54 µm. This spot displacement of 0.54 µm is not negligible when the optical head is used for reproducing signals recorded in signal pits of the optical disk on the order of submicrons, and may result in a fatal defect.

SUMMARY OF THE INVENTION

A prism of the present invention includes: a first portion made of a first material having a wavelength dependency in a refractive index; and a second portion abutting to the first portion, the second portion being made of a second material having a wavelength dependency in a refractive index which is different from the wavelength dependency in the refractive index of the first material. The first portion and the second portion have shapes such that the wavelength dependency in the refractive index of the first portion and the wavelength dependency in the refractive index of the second portion are substantially cancelled by each other.

The first portion and the second portion may be directly adhered to each other.

The prism may be a reflective-type prism including a reflecting portion within a light path from an external incident light to an emitting light. In such a case, when a surface A denotes a surface of the first portion on which the external incident light is incident, a surface B denotes a joint surface between the first portion and the second portion, and a surface C denotes a surface of the second portion facing the surface B; the light path of the reflective-type prism is such that the external incident light is incident on and refracted at the surface A, the light refracted at the surface A is incident on and refracted at the surface B, the light refracted at the surface B is incident on and reflected by the surface C, the light reflected by the surface C is again incident on and refracted at the surface B, and the light refracted at the surface B is again incident on and refracted at the surface A, and thereby supplied to the outside of the prism as the emitting light.

Preferably, a spatial light intensity distribution of an emitting light is changed from a spatial light intensity distribution of an external incident light.

The wavelength dependency in the refractive index of the second material may be larger than the wavelength dependency in the refractive index of the first material. In such a case, when an emitting light is spatially magnified with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_2>\alpha_3>\alpha_1$ is satisfied. On the other hand, when an emitting light is spatially reduced with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_2<\alpha_3<\alpha_1$ is satisfied. In the above, $\alpha_1$, $\alpha_2$ and $\alpha_3$ are angles made by the surfaces A, B and C with respect to the incident direction of the external incident light, respectively.

Alternatively, the wavelength dependency in the refractive index of the second material may be smaller than the wavelength dependency in the refractive index of the first material. In such a case, when an emitting light is spatially magnified with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3>\alpha_1>\alpha_2$ is satisfied. On the other hand, when an emitting light is spatially reduced with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3<\alpha_1<\alpha_2$ is satisfied. In the above, $\alpha_1$, $a_2$ and $\alpha_3$ are angles made by the surfaces A, B and C with respect to the incident direction of the external incident light, respectively.

According to another aspect of the present invention, an optical beam shaping apparatus includes: a light source; a collimating lens for converting light emitted from the light source to parallel light; and a prism which receives the parallel light converted by the collimated lens as an external incident light and supplies emitting light. The optical beam shaping apparatus is used for changing a spatial light intensity distribution between the external incident light on the prism and the emitting light emitting from the prism. The prism has the above-mentioned features.

According to still another aspect of the present invention, an optical head device includes an optical beam shaping apparatus having the above-mentioned features.

According to still another aspect of the present invention, a method is provided for producing a prism including a first portion made of a first material having a wavelength dependency in a refractive index and a second portion abutting to the first portion, the second portion being made of a second material having a wavelength dependency in a refractive index different from the wavelength dependency in the refractive index of the first material. The method includes the steps of: selecting a combination of the first material and the second material; generating a line segment on a coordinate plane which has a refractive index $n_1$ of the first material and a refractive index $n_2$ of the second material as coordinate axes, the line segment illustrating changes in the refractive indices $n_1$ and $n_2$ according to a change in a wavelength of light; generating a plurality of groups of contour lines on the coordinate plane, each of the groups of contour lines illustrating a change of an emitting angle of an emitting light from the prism with respect to the refractive indices $n_1$ and $n_2$, while using, as parameters, a first angle $\alpha_1$, a second angle $\alpha_2$ and a third angle $\alpha_3$ which determine a shape of the first portion and the second portion; finding a combination of the first angle $\alpha_1$, the second angle $\alpha_2$ and the third angle $\alpha_3$ such that a slope of the line segment and a slope of the group of the contour lines at a predetermined emitting angle in the coordinate plane are substantially the same; comparing a magnification or reduction ratio of the emitting light obtained for the found combination with respect to an incident light to a predetermined value; determining a final selection set of the combination of the first angle $\alpha_1$, the second angle $\alpha_2$ and the third angle $\alpha_3$ based on the comparison; processing the first portion and the second portion into shapes determined based on the values of the first angle $\alpha_1$, the second angle $\alpha_2$ and the third angle $\alpha_3$ of the final selection set; and abutting the processed first portion and the processed second portion to each other.

In the abutting step, the processed first portion and the processed second portion may be directly adhered to each other.

According to still another aspect of the present invention, a method is provided for shaping a light beam including a step of applying an external incident light to a prism so as to obtain an emitting light having a spatial light intensity distribution different from a spatial light intensity distribution of the external incident light. The external incident light is incident on a prism which includes a first portion, made of a first material having a wavelength dependency in a refractive index, and a second portion made of a second material to thereby obtain the emitting light having a desired spatial light intensity distribution, the second portion abutting to the first portion and having a wavelength dependency in a refractive index thereof which is different from the wavelength dependency in the refractive index of the first material, the first portion and the second portion having shapes such that the wavelength dependency in the refractive index of the first portion and the wavelength dependency in the refractive index of the second portion are substantially cancelled by each other.

The first portion and the second portion of the prism may be directly adhered to each other.

According to the present invention, a prism includes a first portion and a second portion. Any change in the emitting light angle, which is caused by a wavelength dependency in the refractive index (dispersion) of a material forming the first portion of the prism, is canceled by a wavelength dependency in the refractive index (dispersion) of a material forming the second portion of the prism. As a result, a change in an azimuth angle (the emitting angle) of the emitting light, which otherwise would be caused by fluctuations in the oscillation wavelength of a light source, is suppressed as a whole. Accordingly, no dislocation of a beam spot is caused due to wavelength fluctuations in the light beam emitted from the semiconductor laser as a light source when a light beam (an emitted light beam) emitted from the prism of the present invention is focused by an objective lens.

Thus, the invention described herein makes possible the advantages of (1) providing a prism in which the adverse influence of the wavelength dependency in refractive index (dispersion) of a glass material for forming the prism is cancelled, and a method for producing such a prism; (2) providing an optical beam shaping apparatus using the above-mentioned prism, in which a change in the emitting light angle is suppressed without being affected by the fluctuations of oscillation wavelength of a semiconductor laser as a light source, and a method for shaping an optical beam; and (3) providing an optical head device using the above-described optical beam shaping apparatus and the above-described method for shaping the optical beam.

These and other advantages of the present invention will become apparent to those skilled in the art upon reading and understanding the following detailed description with reference to the accompanying figures.

BRIEF DESCRIPTION OF THE DRAWINGS

FIG. 5 is a contour line diagram illustrating values of an emitting angle $\theta_{321}'$ with respect to refractive indices $n_1$, and $n_2$ under further different conditions according to the present invention.

DESCRIPTION OF THE PREFERRED EMBODIMENTS

Hereinafter, the present invention will be described by way of illustrative examples with reference to FIGS. 2 through 5.

Figure 1:
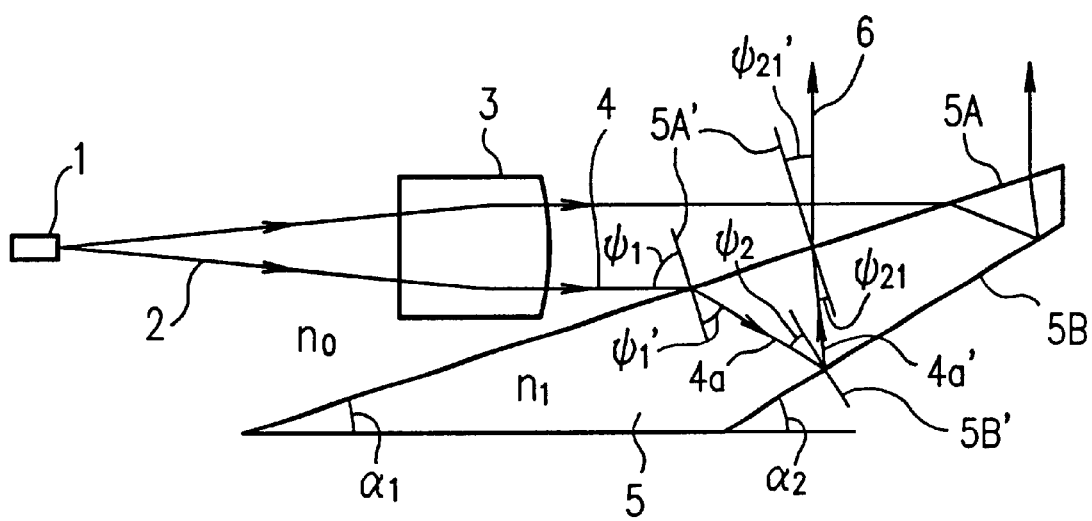
FIG. 1 is a schematic cross-sectional view showing an example of a conventional optical beam shaping apparatus.
Figure 2:
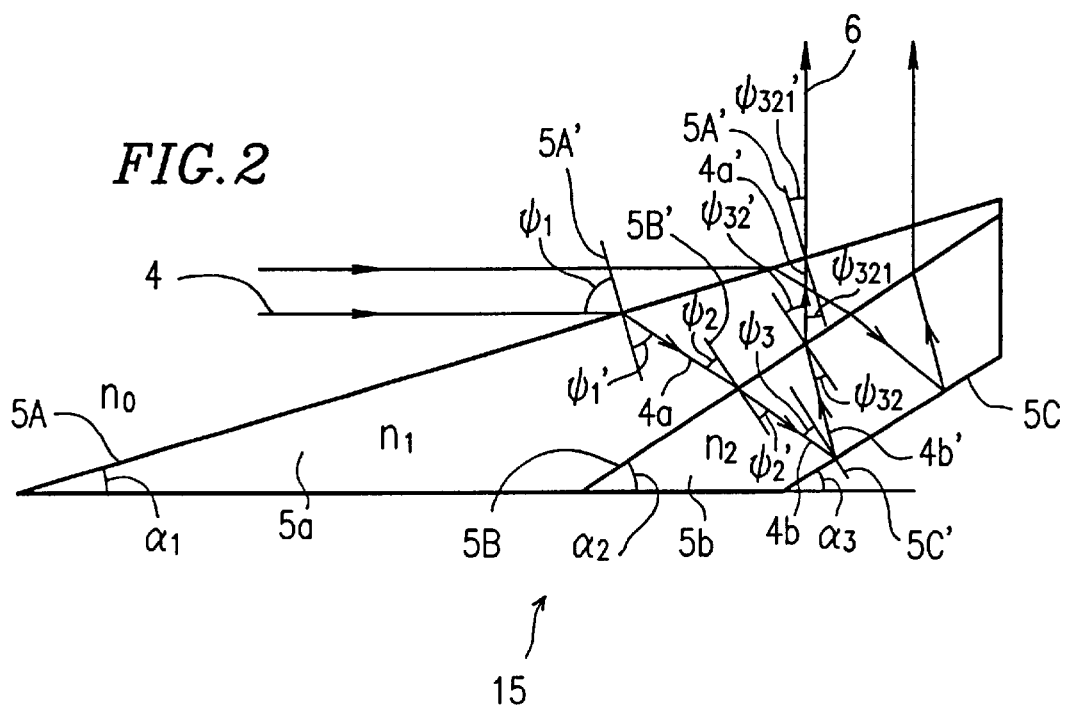
FIG. 2 is a schematic cross-sectional view showing an optical beam shaping apparatus according to one example of the present invention.

FIG. 2 is a schematic cross-sectional view showing an optical beam shaping apparatus according to one example of the present invention. The structure of the optical beam shaping apparatus shown in FIG. 2 is substantially the same as that shown in FIG. 1 except that a structure of a prism 15 is different. The light source system (e.g., the semiconductor laser 1 and the collimating lens 3) shown in FIG. 1 is omitted in FIG. 2 for the sake of clarity. According to the present example, a refractive index of air is referred to as $n_0=1$.

As shown in FIG. 2, the prism 15 used in the optical beam shaping apparatus according to the present invention is a composite prism 15 including a first prism portion 5a and a second prism portion 5b having different dispersive characteristics. The first prism portion 5a and the second prism portion 5b are abutting, and preferably, directly adhered to each other.

In the optical beam shaping apparatus shown in FIG. 2, laser light emitted from a semiconductor laser is converted into the parallel light 4 by a collimating lens. The parallel light 4, in turn, is incident on a surface 5A of the prism 15 made of a glass material (with a refractive index of $n_1$) at an incident angle $\psi_1$ (wherein $\psi_1$ is an angle defined by the incident light 4 and a normal 5A' to the surface 5A of the prism portion 5a). The incident light 4 is refracted at the surface 5A and becomes a refracted light 4a having a refractive angle $\psi_1'$ with respect to the normal 5A' and having an angle $\theta_2$ (not shown) with respect to the incident light 4.

The refracted light 4a is incident on a joint surface 5B between the prism portions 5a and 5b at an incident angle $\psi_2$ (wherein $\psi_2$ is an angle defined by the light 4a and a normal 5B' to the surface 5B). The incident light is refracted at the surface 5B and becomes refracted light 4b having a refraction angle $\psi_2'$ with respect to the normal 5B' and having an angle $\theta_3$ (not shown) with respect to the incident light 4. The refracted light 4b reflects off a bottom surface 5C of the prism portion 5b at an incident angle $\psi_3$ (wherein $\psi_3$ is an angle defined by the light 4b and a normal 5C' to the surface 5C) and becomes a reflected light 4b'. An angle made by the reflected light 4b' to the incident light 4 is referred to as an angle $\theta_3'$ (not shown).

The reflected light 4b' is incident on the surface 5B at an incident angle $\psi_{32}$ (wherein $\psi_{32}$ is an angle defined by the light 4b' and the normal 5B'), thereby being refracted at a refractive angle $\psi_{32}'$ to the normal 5B' and becomes refracted light 4a'. An angle made by the refracted light 4a' to the original incident light 4 is referred to as an angle $\theta_{32}'$ (not shown).

The reflected light 4a' is incident on the surface 5A at an incident angle $\psi_{321}$ (wherein $\psi_{321}$ is an angle defined by the light 4a' and the normal 5A'), thereby being refracted at a refractive angle $\psi_{321}'$ with respect to the normal 5A' and becomes emitting light 6. An angle made by the refracted light 6 (i.e., the emitting light 6) to the original incident light 4 is referred to as an azimuth angle $\theta_{321}'$ (not shown).

When the surface 5A of the prism portion 5a is inclined by $\alpha_1$ to the incident light 4, the incident angle $\psi_1$ is characterized as the above-mentioned Formula (1). Further, the above-mentioned Formula (2) is derived from Snell's Law at the surface 5A. Due to this refraction, the incident light 4 is either magnified or reduced by a factor of (cos $\psi_1'$/cos $\psi_1$) within the refracting plane. The azimuth angle $\theta_2$ of the refracted light 4a is given by the above-mentioned Formula (3). When the bottom surface 5B of the prism portion 5a (i.e., the joint surface 5B) is inclined by $\alpha_2$ to the incident light 4, the incident angle $\psi_2$ is characterized as the above-mentioned Formula (4).

Further, the following Formula (10) is derived from Snell's Law at the surface 5B:

$$n_1 \sin \psi_2 = n_2 \sin \psi_2' \quad \text{Formula (10)}$$

Due to this refraction, the light is further magnified or reduced by a factor of (cos $\psi_2'$/cos $\psi_2$) within the refracting plane. The azimuth angle $\theta_3'$ of the refracted light 4b is given by the following Formula (11):

$$\theta_3 = \pi/2 + \alpha_2 + \psi_2' \quad \text{Formula (11)}$$

When the bottom surface 5C of the prism portion 5b is inclined by $\alpha_3$ to the incident light 4, the incident angle $\psi_3$ is characterized as follows:

$$\psi_3 = \pi/2 - \alpha_3 + \theta_3 \quad \text{Formula (12)}$$

Further, due to the Law of Reflection at the bottom surface 5C, the following Formula (13) is derived:

$$\theta_3' = \pi/2 + \alpha_3 - \psi_3 \quad \text{Formula (13)}$$

The incident angle $\psi_{32}$, defined by the reflected light 4b' and the normal 5B' to the surface 5B, is given by the following Formula (14):

$$\psi_{32} = \pi/2 + \alpha_2 - \theta_3^{1'} \quad \text{Formula (14)}$$

Further, the following Formula (15) is derived from Snell's Law at the surface 5B:

$$n_2 \sin \psi_{32} = n_1 \sin \psi_{32}' \quad \text{Formula (15)}$$

Due to this refraction, the light is further magnified or reduced by a factor of (cos $\psi_{32}'$/cos $\psi_{32}$) within the refracting plane. An azimuth angle $\theta_{32}'$ of the reflected light 4a' is given by the following Formula (16):

$$\theta_{32}' = \pi/2 + \alpha_2 - \psi_{32}' \quad \text{Formula (16)}$$

The incident angle $\psi_{321}$, defined by the reflected light 4a' and the surface 5A, is given by the following Formula (17):

$$\psi_{321} = \pi/2 + \alpha_1 - \theta_{32}' \quad \text{Formula (17)}$$

Further, the following Formula (18) is derived from Snell's Law at the surface 5A:

$$n_1 \sin \psi_{321} = \sin \psi_{321}' \quad \text{Formula (18)}$$

Due to this refraction, the light is further magnified or reduced by a factor of (cos $\psi_{321}'$/cos $\psi_{321}$) within the refracting plane.

The azimuth angle $\theta_{321}'$ of the emitting light 6 is given by the following Formula (19):

$$\theta_{321}' = \pi/2 + \alpha_1 - \psi_{321}' \quad \text{Formula (19)}$$

The emitting light 6 is either magnified or reduced by a factor of m within the refracting plane due to the four refractions (two refractions at each of the surfaces 5A and 5B), where m is given by the following Formula (20):

$$m = (\cos \psi_1'/\cos \psi_1) \cdot (\cos \psi_2'/\cos \psi_2) \cdot (\cos \psi_{32}'/\cos \psi_{32}) \cdot (\cos \psi_{321}'/\cos \psi_{321}) \quad \text{Formula (20)}$$

By sequentially applying the above-mentioned Formulae (1) through (20), the azimuth angle $\theta_{321}'$ of the emitting light 6 and the enlargement (reduction) ratio m are obtained while using angles $\alpha_1$, $\alpha_2$, and $\alpha_3$ (which define the shapes of the prism portions 5a and 5b of the composite prism 15) and refractive indices $n_1$ and $n_2$ of the prism portions 5a and 5b as parameters.

Figure 3:
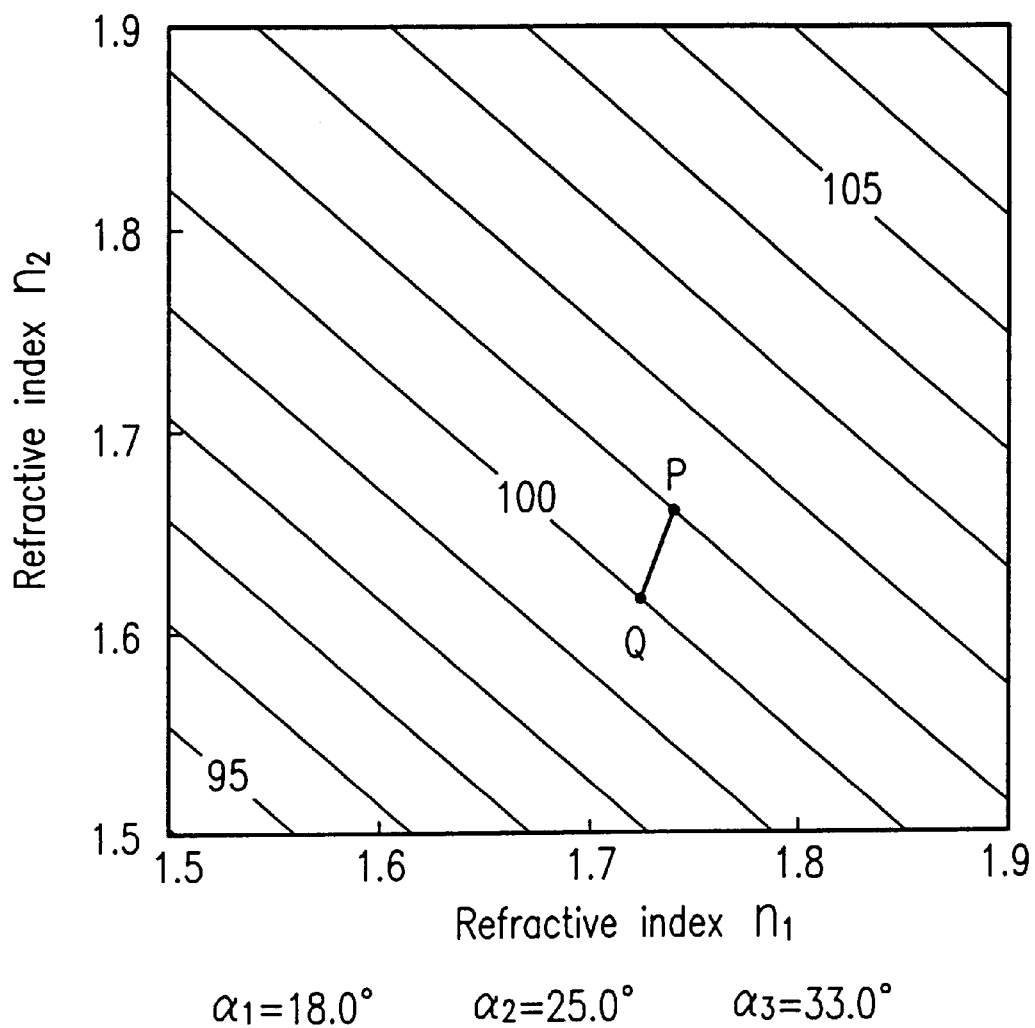
FIG. 3 is a contour line diagram illustrating values of an emitting angle $\theta_{321}'$ with respect to refractive indices $n_1$ and $n_2$ under certain conditions according to the present invention.

FIG. 3 is a contour line diagram illustrating values of the emitting angle $\theta_{321}'$ with respect to the refractive indices $n_1$ and $n_2$, where $\alpha_1$=18.0°, $\alpha_2$=25.0° and $\alpha_3$=33.0°. For example, a straight line indicated as "100" in FIG. 3 is a line (a contour line) illustrating combinations (coordinates) of the refractive indices $n_1$ and $n_2$ where the emitting angle $\theta_{321}'$ of 100° is obtained.

Referring to FIG. 3, each contour line is a straight line having a negative slope.

In general, when the wavelength of the light increases by $d\lambda$, the refractive indices $n_1$ and $n_2$ of the glass materials forming the prism portions 5a and 5b, respectively, change to ($n_1 - k_1 \cdot d\lambda$) and ($n_2 - k_2 \cdot d\lambda$) (where $k_1$ and $k_2$ are coefficients). This change is shown in FIG. 3 in an exaggerated manner as a line segment having the starting point at P ($n_1$, $n_2$) and the end point at Q ($n_1 - k_1 \cdot d\lambda$, $n_2 - k_2 \cdot d\lambda$).

In the example shown in FIG. 3, for example, an emitting angle $\theta_{321}'$ at point P is 101° whereas an emitting angle $\theta_{321}'$ at point Q is 100°. This indicates that the emitting angle $\theta_{321}'$ is changed by 1° when the refractive indices $n_1$ and $n_2$ of the glass materials forming the prism portions 5a and 5b are changed due to the change $d\lambda$ in the wavelengths.

Since the above-mentioned coefficients $k_1$ and $k_2$ are always positive in any glass materials, the line segment PQ always has a positive slope $k_2/k_1$, wherein the slope $k_2/k_1$ provides an indication regarding how the emitting angle $\theta_{321}'$ changes in accordance with changes in the wavelength of incident light.

For example, when BK7 is selected as a glass material for forming the prism portion 5a and SF6 is selected as a glass material for forming the prism portion 5b, the prism portions 5a and 5b will have a refractive index $n_1$ of 1.51425 and a refractive index $n_2$ of 1.79750 at a wavelength of 0.64385 $\mu$m, and a refractive index $n_1$ of 1.51243 and a refractive index $n_2$ of 1.79118 at a wavelength of 0.70652 $\mu$m. Accordingly, $k_2/k_1$ is 3.47. On the other hand, when SF6 is selected as the glass material for forming the prism portion 5a and BK7 is selected as the glass material for forming the prism portion 5b, $k_2/k_1$ is 0.288.

The prism 15 is preferably designed so that, even when the refractive indices $n_1$ and $n_2$ of the glass materials for forming the prism portions 5a and 5b are changed due to the change in the wavelengths of the incident light, adverse effects of the change are cancelled as a whole and the value of the azimuth angle $\theta'_{321}$ of the final emitting light 6 is not changed. Referring to FIG. 3, the slope of the segment PQ, which shows the change of the refractive indices $n_1$ and $n_2$ of the glass materials for forming the prisms 5a and 5b due to the change of the wavelength of the light should be the same as (in other words, parallel to) the slope of the contour lines. According to the present invention, the angles $\alpha_1$, $\alpha_2$ and $\alpha_3$ which define the shapes of the prism portions 5a and 5b of the composite prism 15 are suitably set such that the slope of the contour lines in FIG. 3 have the same slope as that of the segment PQ.

Figure 4:
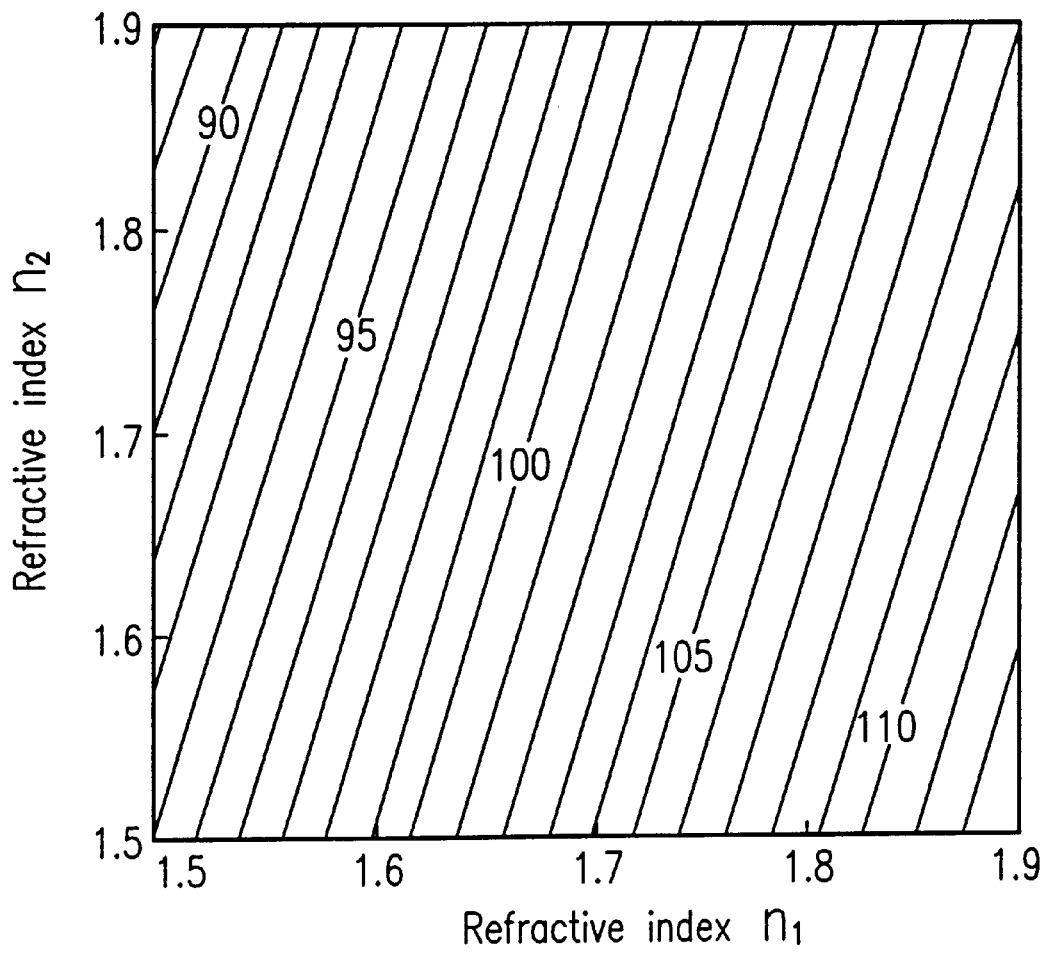
FIG. 4 is a contour line diagram illustrating values of an emitting angle $\theta_{321}'$ with respect to refractive indices $n_1$ and $n_2$ under different conditions according to the present invention.

FIG. 4 is a contour line diagram illustrating values of the emitting angle $\theta_{321}'$ with respect to the refractive indices $n_1$ and $n_2$, where $\alpha_1=18.0°$, $\alpha_2=39.0°$ and $\alpha_3=33.0°$. As in FIG. 3, a straight line indicated as "100" in FIG. 4 is a line (a contour line) illustrating combinations (coordinates) of the refractive indices $n_1$ and $n_2$ where the emitting angle $\theta_{321}'$ of 100° is obtained.

Each contour line shown in FIG. 4 is a straight line having a slope of about 3.6.

For example, when BK7 is selected as a glass material for forming the prism portion 5a and SF6 is selected as a glass material for forming the prism portion 5b, the emitting angle $\theta'_{321}$ is 90.2330° at the wavelength of 0.64385 μm, and 90.2275° at the wavelength of 0.70652 μm. Moreover, a magnification ratio m of 2.35 is obtained. Accordingly, a prism 15 is obtained in which the change in the emitting angle due to the change in the wavelength of the incident light is extremely small (specifically, 1/12 the change in the emitting angle compared to the conventional optical beam shaping apparatus) while a sufficient beam magnification ratio m is maintained.

FIG. 5 is a contour line diagram illustrating values of the emitting angle $\theta_{321}'$ with respect to the refractive indices $n_1$ and $n_2$, where $\alpha_1=18.0°$, $\alpha_2=12.0°$ and $\alpha_3=33.0°$. As in FIG. 3, a straight line indicated as "100" in FIG. 5 is a line (a contour line) illustrating combinations (coordinates) of the refractive indices $n_1$ and $n_2$ where the emitting angle $\theta_{321}'$ of 100° is obtained.

Each contour line shown in FIG. 5 is a straight line having a slope of about 0.29.

For example, when SF6 is selected as a glass material for forming the prism portion 5a and BK7 is selected as a glass material for forming the prism portion 5b, the emitting angle $\theta'_{321}$ is 89.6084° at the wavelength of 0.64385 μm, and 89.60980 at the wavelength of 0.70652 μm. Moreover, a magnification ratio m is 2.30. Accordingly, a prism 15 is obtained in which the change in the emitting angle due to the change in the wavelength of the incident light is extremely small (specifically, 1/46 the change in the emitting angle compared to the conventional optical beam shaping apparatus) while a sufficient beam magnification ratio m is maintained.

In FIGS. 4 and 5, the traveling direction of the emitting light 6 is bent by an angle of about 90° with respect to that of the incident light 4, and the beam is magnified by a factor of about 2.5 within the refracting plane. Accordingly, the prism 15 according to the present invention is able to cancel the adverse influence of the wavelength dependency on the refractive index (dispersion) of the glass material for forming the prism 15. At the same time, the prism 15 according to the present invention magnifies an oval spatial light intensity distribution (an oval cross-sectional intensity) of the semiconductor laser in a direction along a minor axis of the oval distribution, whereby a parallel light having a circular spatial light intensity distribution (a circular cross-sectional intensity) is obtained.

In order to obtain a desired contour line diagram as FIGS. 4 and 5 which illustrate the emitting angle with respect to the refractive indices $n_1$ and $n_2$ of glass materials forming the prism portions 5a and 5b, a combination of angles $\alpha_1$, $\alpha_2$ and $\alpha_3$ is determined as follows (i.e., a principle for designing desired prism portions 5a and 5b which provide preferable characteristics as illustrated in FIGS. 4 and 5).

(1) Regarding the above-described coefficients $k_1$ and $k_2$ (in the formula for indicating the change in the refraction index due to the change in the wavelengths), combinations of glass materials where the ratio $k_2/k_1$ is in a prescribed range, for example, of 3 or higher or ⅓ or lower, are selected. Selections of combinations are further made in view of the processability and the environmental durability of the glass materials as the selection guidelines.

(2) One combination is selected among the thus-obtained selections (for example, in the above-described example, the combination of SF6 and BK7 is selected). Then, a line segment PQ between the above-described point P ($n_1$, $n_2$) and the above-described point Q ($n_1-k_1 \cdot d\lambda$, $n_2-k_2 \cdot d\lambda$) is drawn on a coordinate plane which have refractive indices $n_1$ and $n_2$ of the selected glass materials as x- and y-axes, respectively.

(3) A contour line diagram such as those shown in FIGS. 3 through 5 is drawn for an azimuth angle (emitting angle) $\theta_{321}'$ of the emitting light with respect to the refractive indices $n_1$ and $n_2$ of the selected combination of glass materials while using a combination of the angles $\alpha_1$, $\alpha_2$ and $\alpha_3$ as parameters. More specifically, a series of the contour line diagrams is drawn while changing the values of the angles $\alpha_1$, $\alpha_2$ and $\alpha_3$.

(4) With respect to each of the thus drawn contour line diagrams, it is determined whether or not a slope of the contour line at a desired azimuth angle (emitting angle) $\theta_{321}'$ (e.g., $\theta_{321}'=90°$) of the emitting light is substantially the same as the slope of the line segment PQ.

(5) When a combination of the angles $\alpha_1$, $\alpha_2$ and $\alpha_3$ satisfying the conditions described above in section (4) is found, it is then determined whether or not a magnification ratio m of the laser beam obtainable under the particular conditions is sufficiently close to the preferable design value (e.g., m=2.5).

(6) The above-described sections (3) through (5) are repeated until the conditions described in section (5) are satisfied.

As can be appreciated from FIGS. 4 and 5, in order to obtain a contour line diagram with a slope of $k_2/k_1$ for determining shapes of the prism portions 5a and 5b, the values of the angles $\alpha_1$, $\alpha_2$ and $\alpha_3$ are set such that when the dispersion of the prism 5b is greater than that of the prism 5a, the relationship $\alpha_2>\alpha_3>\alpha_1$ is satisfied. On the other hand, when the dispersion of the prism portion 5b is smaller than that of the prism portion 5a, shapes of the prism portions 5a and 5b are determined by setting the values of the angles $\alpha_1$, $\alpha_2$ and $\alpha_3$ so as to satisfy the relationship $\alpha_3>\alpha_1>\alpha_2$.

In the case where a light travelling direction is reversed (i.e., in the case of reducing the beam), in other words, light is incident on the side of the prism 15 from which the emitting light 6 is exiting in FIG. 2 so that the light exits from the side of the prism on which the light 4 is incident in FIG. 2, the angles $\alpha_1$, $\alpha_2$ and $\alpha_3$ are replaced by $\pi/2-\alpha_1$, $\pi/2-\alpha_2$ and $\pi/2-\alpha_3$, respectively. In this case, in order to obtain a preferable contour line diagram with a desired slope of $k_2/k_1$, shapes of the prism portions 5a and 5b are determined by setting the values of the angles $\alpha_1$, $\alpha_2$ and $\alpha_3$ such that: the relationship $\alpha_2<\alpha_3<\alpha_1$ is satisfied when the dispersion of the prism 5b is larger than that of the prism 5a; and the relationship $\alpha_3 < \alpha_1 < \alpha_2$ is satisfied when the dispersion of the prism portion 5b is smaller than that of the prism portion 5a.

According to the above-described example, the prism portions 5a and 5b are directly adhered to each other. Alternatively, the same advantages as described above are obtained when the prism portions 5a and 5b have a space, or a layer of other material, therebetween at the joint surface 5B, as long as the optical influences of such a space or a layer is negligible.

As described above, according to the present invention, a prism is realized in which a possible change in the emitting light angle, which is caused by a wavelength dependency in a refractive index (dispersion) of a material (a glass material) forming a first portion of the composite prism, is canceled by a wavelength dependency in a refractive index (dispersion) of a material (a glass material) forming a second portion of the composite prism. By using this prism, an optical beam shaping apparatus is provided in which the undesirable change in the emitting angle of the emitting light is suppressed without being influenced by variations in the oscillation wavelength of the semiconductor laser light source.

Furthermore, a high-performance optical head device, and an optical disk apparatus utilizing the same, are provided in which no dislocation of the beam spot is caused by wavelength fluctuations when a light beam emitted from the optical beam shaping apparatus is focused by an objective lens.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A prism comprising:
   a first portion made of a first material having a wavelength dependency in a refractive index; and
   a second portion abutting to the first portion, the second portion being made of a second material having a wavelength dependency in a refractive index which is different from the wavelength dependency in the refractive index of the first material,
   wherein the first portion and the second portion have shapes such that the wavelength dependency in the refractive index of the first portion and the wavelength dependency in the refractive index of the second portion are substantially cancelled by each other and the prism is a reflective-type prism including a reflecting portion within a light path from an external incident light to an emitting light,
   wherein a surface A denotes a surface of the first portion on which the external incident light is incident, a surface B denotes a joint surface between the first portion and the second portion, and a surface C denotes a surface of the second portion facing the surface B; the light path of the reflective-type prism is such that the external incident light is incident on and refracted at the surface A, the light refracted at the surface A is incident on and refracted at the surface B, the light refracted at the surface B is incident on and reflected by the surface C, the light reflected by the surface C is again incident on and refracted at the surface B, and the light refracted at the surface B is again incident on and refracted at the surface A, and thereby supplied to the outside of the prism as the emitting light, and wherein the wavelength dependency in the refractive index of the second material is smaller than the wavelength dependency in the refractive index of the first material; and
   when an emitting light is spatially magnified with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3 > \alpha_1 > \alpha_2$ is satisfied, wherein $\alpha_1$, $\alpha_2$ and $\alpha_3$ are angles made by the surfaces A, B and C with respect to the incident direction of the external incident light, respectively.

2. A prism according to claim 1, wherein the first portion and the second portion are directly adhered to each other.

3. A prism according to claim 1, wherein a spatial light intensity distribution of an emitting light is changed from a spatial light intensity distribution of an external incident light.

4. An optical beam shaping apparatus, comprising:
   a light source;
   a collimating lens for converting light emitted from the light source to parallel light; and
   a prism which receives the parallel light converted by the collimated lens as an external incident light and supplies emitting light,
   wherein, the optical beam shaping apparatus is used for changing a spatial light intensity distribution between the external incident light on the prism and the emitting light emitting from the prism, and
   wherein the prism is the one according to claim 1.

5. An optical head device comprising an optical beam shaping apparatus, wherein the optical beam shaping apparatus is the one according to claim 4.

6. A prism comprising:
   a first portion made of a first material having a wavelength dependency in a refractive index; and
   a second portion abutting to the first portion, the second portion being made of a second material having a wavelength dependency in a refractive index which is different from the wavelength dependency in the refractive index of the first material,
   wherein the first portion and the second portion have shapes such that the wavelength dependency in the refractive index of the first portion and the wavelength dependency in the refractive index of the second portion are substantially cancelled by each other and the prism is a reflective-type prism including a reflecting portion within a light path from an external incident light to an emitting light,
   wherein a surface A denotes a surface of the first portion on which the external incident light is incident, a surface B denotes a joint surface between the first portion and the second portion, and a surface C denotes a surface of the second portion facing the surface B; the light path of the reflective-type prism is such that the external incident light is incident on and refracted at the surface A, the light refracted at the surface A is incident on and refracted at the surface B, the light refracted at the surface B is incident on and reflected by the surface C, the light reflected by the surface C is again incident on and refracted at the surface B, and the light refracted at the surface B is again incident on and refracted at the surface A, and thereby supplied to the outside of the prism as the emitting light, and wherein the wavelength dependency in the refractive index of the second material is smaller than the wavelength dependency in the refractive index of the first material; and when an emitting light is spatially reduced with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3<\alpha_1<\alpha_2$ is satisfied, wherein $\alpha_1$, $\alpha_2$ and $\alpha_3$ are angles made by the surfaces A, B and C with respect to the incident direction of the external incident light, respectively.

7. A prism according to claim 6, wherein the first portion and the second portion are directly adhered to each other.

8. A prism according to claim 6, wherein a spatial light intensity distribution of an emitting light is changed from a spatial light intensity distribution of an external incident light.

9. An optical beam shaping apparatus, comprising:
   a light source;
   a collimating lens for converting light emitted from the light source to parallel light; and
   a prism which receives the parallel light converted by the collimated lens as an external incident light and supplies emitting light,
   wherein, the optical beam shaping apparatus is used for changing a spatial light intensity distribution between the external incident light on the prism and the emitting light emitting from the prism, and
   wherein the prism is the one according to claim 6.

10. An optical head device comprising an optical beam shaping apparatus, wherein the optical beam shaping apparatus is the one according to claim 9.

11. A method for shaping a light beam, comprising a step of applying an external incident light to a prism so as to obtain an emitting light having a spatial light intensity distribution different from a spatial light intensity distribution of the external incident light,
   wherein, the external incident light is incident on a prism which includes a first portion, made of a first material having a wavelength dependency in a refractive index, and a second portion made of a second material to thereby obtain the emitting light having a desired spatial light intensity distribution, the second portion abutting to the first portion and having a wavelength dependency in a refractive index thereof which is different from the wavelength dependency in the refractive index of the first material, the first portion and the second portion having shapes such that the wavelength dependency in the refractive index of the first portion and the wavelength dependency in the refractive index of the second portion are substantially cancelled by each other and the prism is a reflective-type prism including a reflecting portion within a light path from an external incident light to an emitting light,
   wherein a surface A denotes a surface of the first portion on which the external incident light is incident, a surface B denotes a joint surface between the first portion and the second portion, and a surface C denotes a surface of the second portion facing the surface B; the light path of the reflective-type prism is such that the external incident light is incident on and refracted at the surface A, the light refracted at the surface A is incident on and refracted at the surface B, the light refracted at the surface B is incident on and reflected by the surface C, the light reflected by the surface C is again incident on and refracted at the surface B, and the light refracted at the surface B is again incident on and refracted at the surface A, and thereby supplied to the outside of the prism as the emitting light, and
   wherein the wavelength dependency in the refractive index of the second material is smaller than the wavelength dependency in the refractive index of the first material; and
   when an emitting light is spatially reduced with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3<\alpha_1<\alpha_2$ is satisfied, wherein $\alpha_1$, $\alpha_2$ and $\alpha_3$ are angles made by the surfaces A, B and C with respect to the incident direction of the external incident light, respectively.

12. A method for shaping a light beam according to claim 11, wherein the first portion and the second portion of the prism are directly adhered to each other.

13. A method for shaping a light beam, comprising a step of applying an external incident light to a prism so as to obtain an emitting light having a spatial light intensity distribution different from a spatial light intensity distribution of the external incident light,
   wherein, the external incident light is incident on a prism which includes a first portion, made of a first material having a wavelength dependency in a refractive index, and a second portion made of a second material to thereby obtain the emitting light having a desired spatial light intensity distribution, the second portion abutting to the first portion and having a wavelength dependency in a refractive index thereof which is different from the wavelength dependency in the refractive index of the first material, the first portion and the second portion having shapes such that the wavelength dependency in the refractive index of the first portion and the wavelength dependency in the refractive index of the second portion are substantially cancelled by each other and the prism is a reflective-type prism including a reflecting portion within a light path from an external incident light to an emitting light,
   wherein a surface A denotes a surface of the first portion on which the external incident light is incident, a surface B denotes a joint surface between the first portion and the second portion, and a surface C denotes a surface of the second portion facing the surface B; the light path of the reflective-type prism is such that the external incident light is incident on and refracted at the surface A, the light refracted at the surface A is incident on and refracted at the surface B, the light refracted at the surface B is incident on and reflected by the surface C, the light reflected by the surface C is again incident on and refracted at the surface B, and the light refracted at the surface B is again incident on and refracted at the surface A, and thereby supplied to the outside of the prism as the emitting light, and
   wherein the wavelength dependency in the refractive index of the second material is smaller than the wavelength dependency in the refractive index of the first material; and when an emitting light is spatially reduced with respect to an external incident light by the prism, where a plurality of angles made by normals to the surfaces A, B and C with respect to an incident direction of the external incident light on the surface A are $\pi/2-\alpha_1$, $\pi/2-\alpha_2$ and $\pi/2-\alpha_3$, respectively; a relationship $\alpha_3<\alpha_1<\alpha_2$ is satisfied, wherein $\alpha_1$, $\alpha_2$ and $\alpha_3$ are angles made by the surfaces A, B and C with respect to the incident direction of the external incident light, respectively.

14. A method for shaping a light beam according to claim 13, wherein the first portion and the second portion of the prism are directly adhered to each other.

* * * * *